C. H. KEITSCH.
FLOWER POT HOLDER.
APPLICATION FILED APR. 13, 1909.
942,177.
Patented Dec. 7, 1909.
2 SHEETS—SHEET 1.
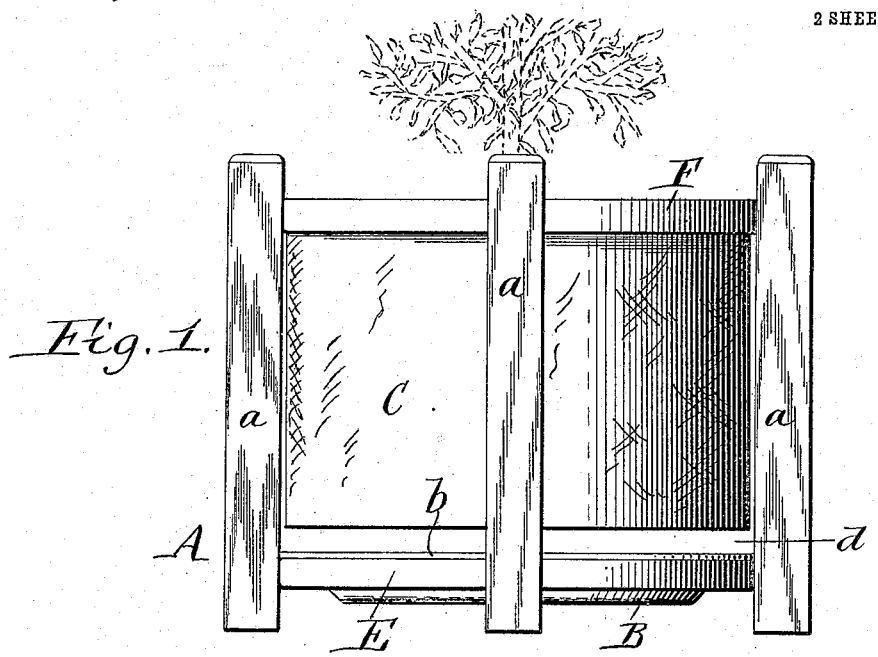
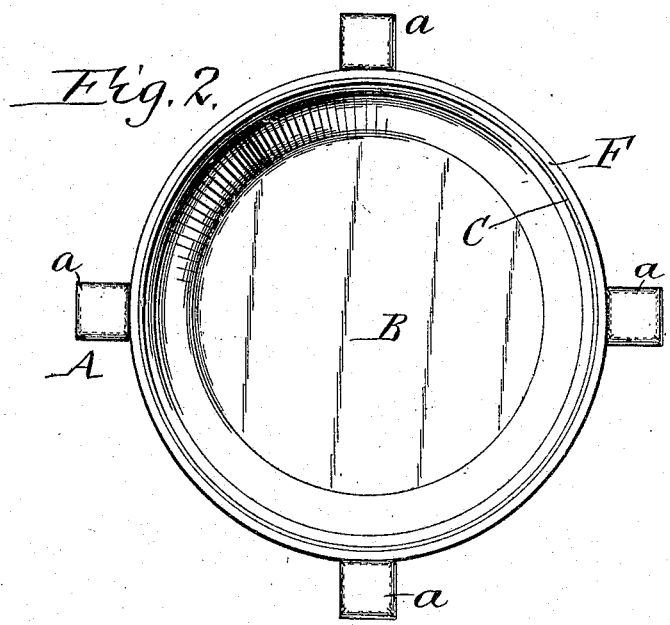
Witnesses:—
Richard Sommer.
John H. Shoemaker.
Inventor
Charles H. Keitsch
by Geyer & Popp
Attorneys.

C. H. KEITSCH.
FLOWER POT HOLDER.
APPLICATION FILED APR. 13, 1909.
942,177.
Patented Dec. 7, 1909.
2 SHEETS—SHEET 2.
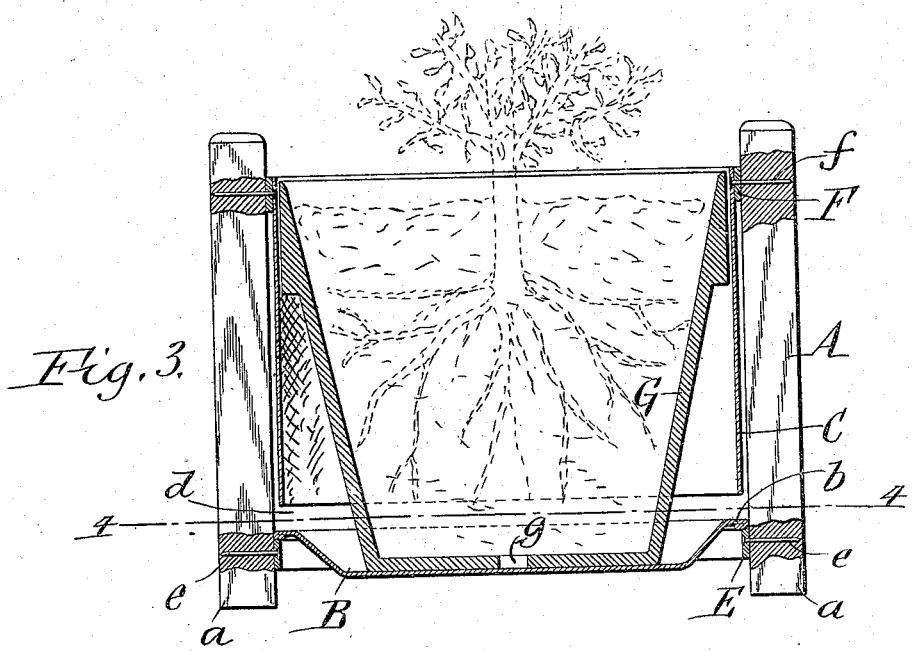
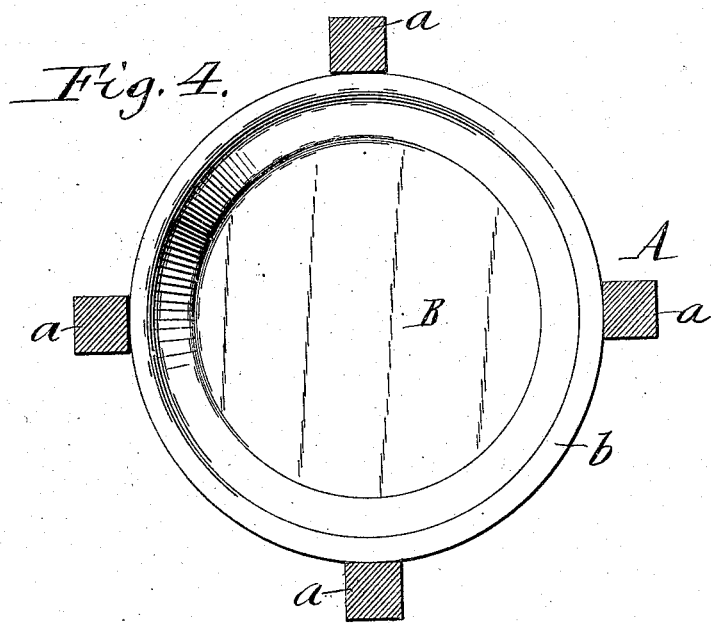
Witnesses:
Richard Sommel
John H. Shoemaker
Inventor
Charles H. Keitsch
by Geyer & Popp
Attorneys.

UNITED STATES PATENT OFFICE.

CHARLES H. KEITSCH, OF BUFFALO, NEW YORK.

FLOWER-POT HOLDER.

942,177.

Specification of Letters Patent.     Patented Dec. 7, 1909.

Application filed April 13, 1909. Serial No. 489,672.

*To all whom it may concern:*

Be it known that I, CHARLES H. KEITSCH, a citizen of the United States, residing at Buffalo, in the county of Erie and State of New York, have invented a new and useful Improvement in Flower-Pot Holders, of which the following is a specification.

The object of this invention is to produce a flower pot holder or stand which is ornamental in appearance and simple and inexpensive in construction and which permits of properly watering the plants and enables the surplus water to be easily discharged without taking the flower pot from the holder, thereby insuring full development of the plants without the inconvenience attending the care of plants when using holders as heretofore constructed.

In the accompanying drawings consisting of two sheets: Figure 1 is a side elevation of my improved flower pot holder or stand. Fig. 2 is a top plan view of the same. Fig. 3 is a vertical section thereof. Fig. 4 is a horizontal section in line 4—4, Fig. 3, with the flower pot omitted.

Similar letters of reference indicate corresponding parts throughout the several views.

In its general organization my improved flower holder or stand comprises an open work frame A, a horizontal pan or tray B supported within the lower part of the frame, and a side wall, curtain or screen C arranged within the upper part of the frame and separated at its lower edge from the marginal part or edge of the pan by an annular space or slot $d$.

As shown in the drawings, the frame preferably consists of a plurality of upright posts $a$ arranged equidistant around the side of the frame, a lower horizontal ring or band E engaging its periphery with the inner sides of the lower parts of the posts and secured thereto by nails $e$ or otherwise, and an upper horizontal ring or band F engaging its periphery with the inner side of the upper parts of the posts and secured thereto by nails $f$ or otherwise.

The pan or tray is dished downwardly and rests with its marginal raised rim $b$ on the upper edge of the lower ring and engages frictionally with the inner sides of the posts, so as to retain the pan centrally within the frame when in use but permit of its removal for cleaning, if desired.

The curtain or screen is preferably constructed in the form of an upright cylinder of card board, cloth, tin or other flexible material suitably decorated on its exterior and secured at its upper edge to the upper ring and posts by the nails $f$ while the lower part of the screen is not attached to the frame but is free.

In using this holder, the pot G containing the plant is placed within the screen with its bottom resting on the pan, the pot selected being preferably of such dimensions that the top of the same is substantially flush with the top of the screen and practically fills the space within the same.

In order to be sure of watering the plant sufficiently it is desirable to water the same more than is necessary. The excess water thus supplied to the plant escapes from the pot through the opening in the bottom thereof into the pan where it may be seen by the attendant upon deflecting the lower unattached part of the screen inwardly. The presence of water in the pan thus indicates to the attendant that the plant has been watered sufficiently. This excess water may now be poured from the pan laterally through the space between the pan and screen by simply tipping the holder while the pot is in the same, thereby avoiding the necessity of removing the pot for this purpose. By this means the plants may be watered properly with ease and convenience, insuring a healthy and vigorous growth of the same which is not the case when the same are watered either insufficiently or excessively in the manner heretofore practiced.

I claim as my invention:

1. A flower pot holder comprising a frame, a pan arranged in the frame and adapted to support a flower pot, and a screen for inclosing the pot mounted on the frame and separated at its lower edge from the pan by an intervening space.

2. A flower pot holder comprising a frame, a pan arranged in the frame and adapted to support a flower pot, and a screen for inclosing the pot secured at its upper edge to the frame and having its lower edge detached from the frame and separated from the pan by an intervening space.

3. A flower pot holder comprising a frame, a pan arranged in the frame and adapted to support a flower pot, and a screen of flexible material for inclosing the pot secured at its upper edge to the frame and having its lower edge detached from the frame and separated from the pan by an intervening space.

4. A flower pot holder comprising a frame composed of a plurality of upright posts, upper and lower horizontal rings secured to upper and lower parts of the posts, a pan resting with its rim on the lower ring, and an annular screen or wall secured at its upper edge to the upper ring and separated at its lower edge from the pan by an intervening space.

Witness my hand this 3rd day of April, 1909.

CHARLES H. KEITSCH.

Witnesses:
 HENRY EVERSON,
 H. F. KEITSCH.